Aug. 9, 1960     W. R. STAMLER ET AL     2,948,235
CAR SHIFTING APPARATUS HAVING COMBINED CAR-ADVANCING
AND CAR-RETARDING ACTIONS
Filed Nov. 10, 1958                             5 Sheets-Sheet 1
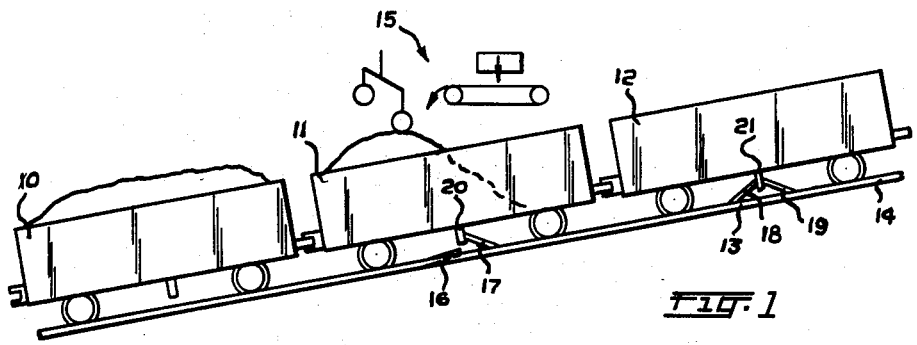
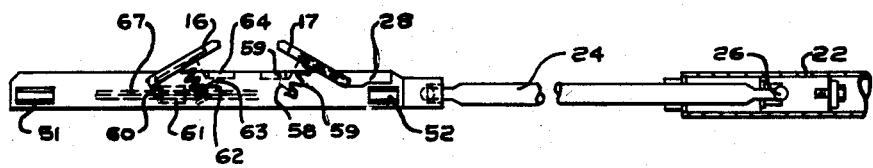
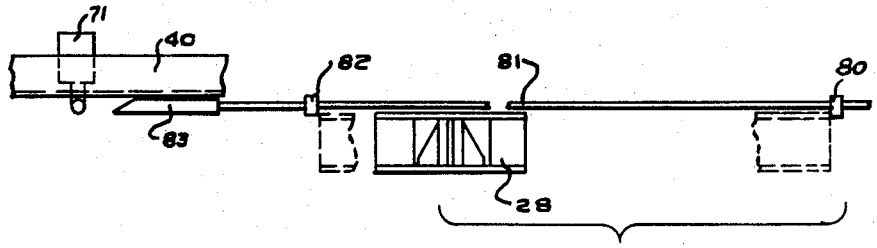
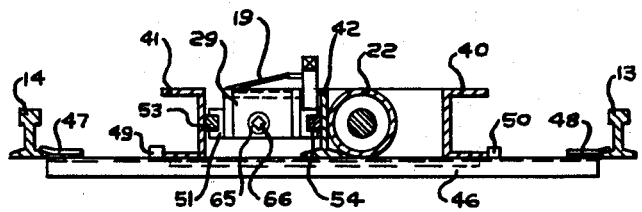
INVENTORS
W. R. STAMLER
L. W. MILLER
BY    W. E. Sherwood
ATTORNEY

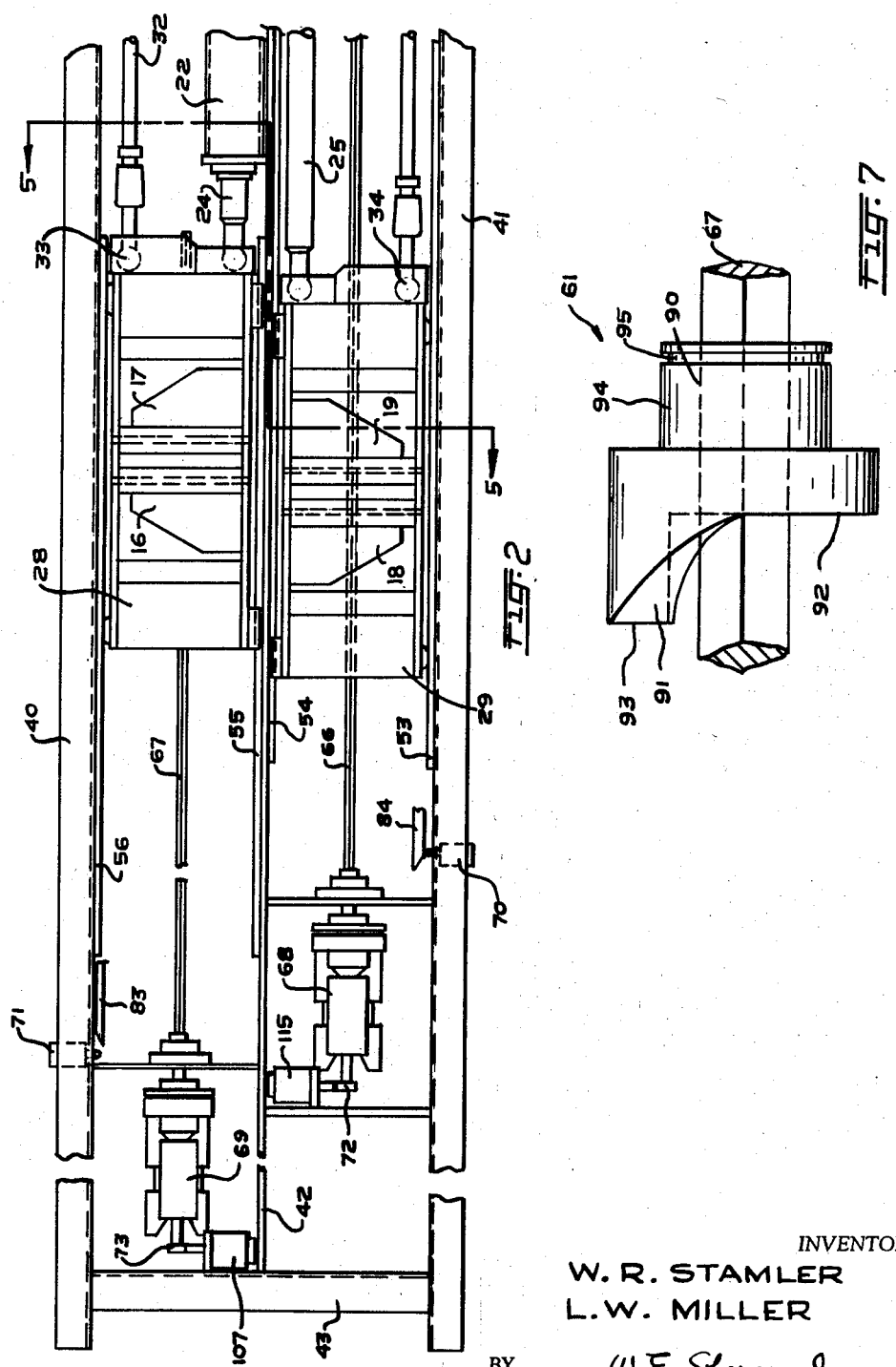

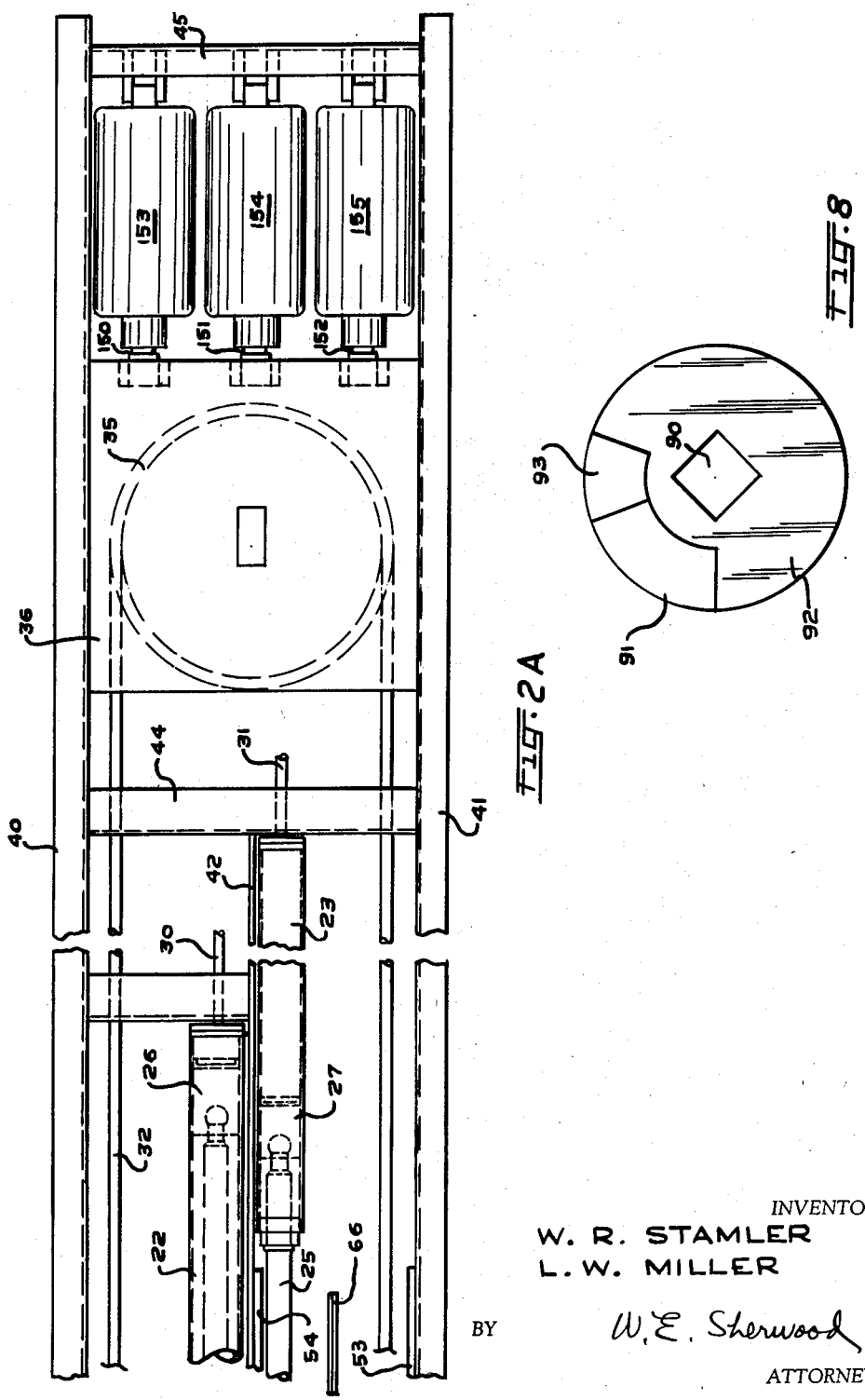

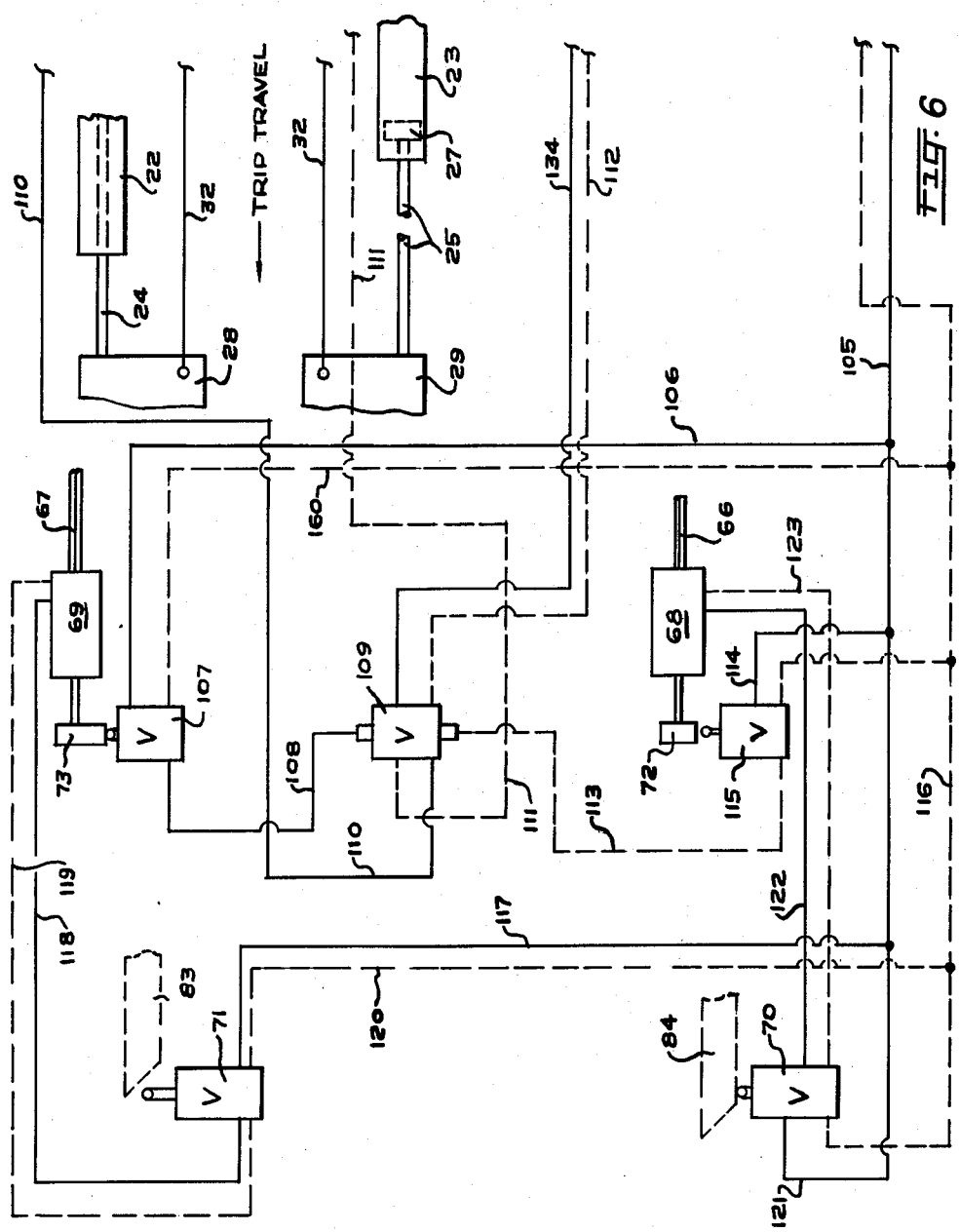

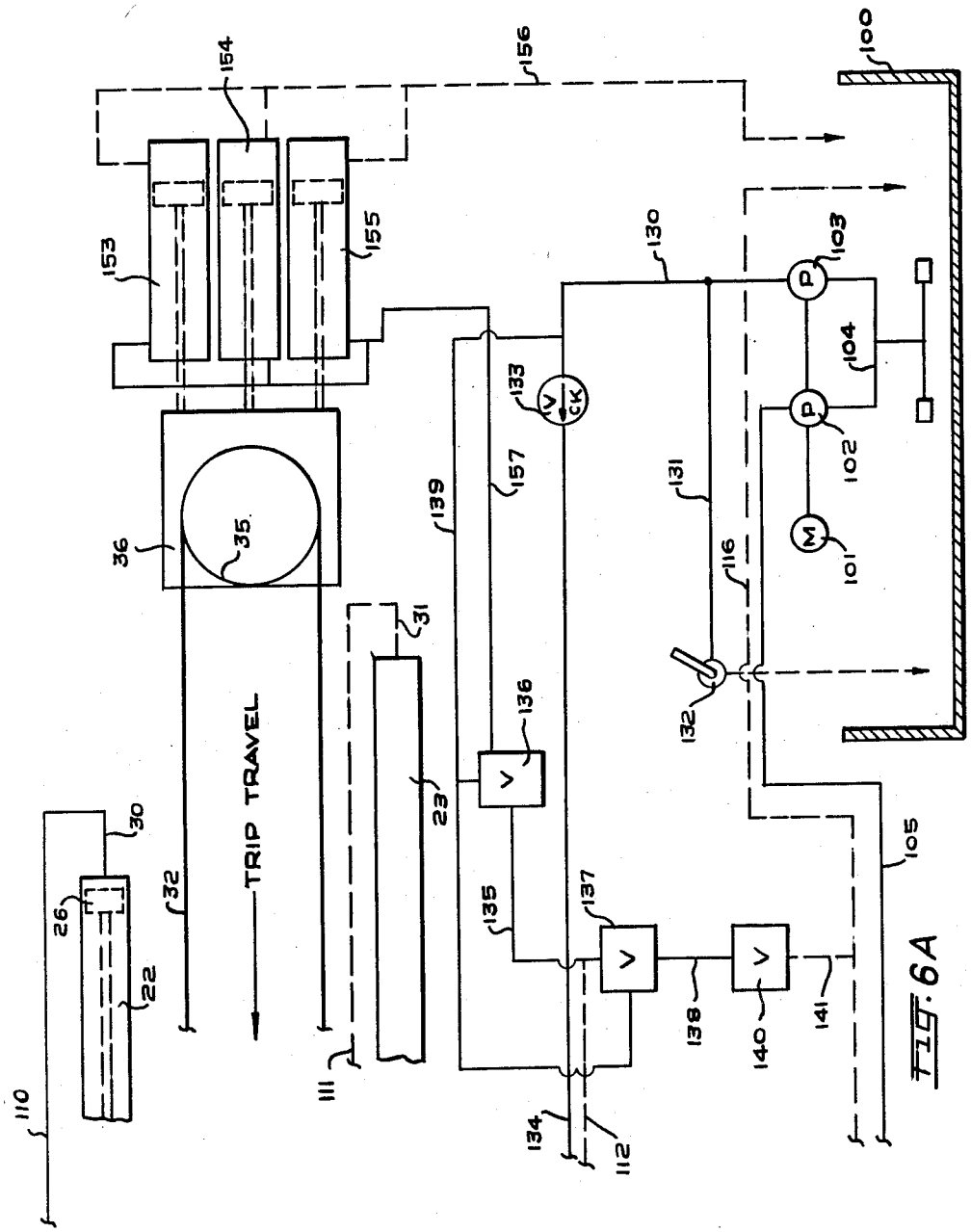

ns Office 2,948,235
Patented Aug. 9, 1960

2,948,235

CAR SHIFTING APPARATUS HAVING COMBINED CAR-ADVANCING AND CAR-RETARDING ACTIONS

William R. Stamler and Labron W. Miller, Paris, Ky., assignors to The W. R. Stamler Corporation, Paris, Ky., a corporation of Kentucky Filed Nov. 10, 1958, Ser. No. 772,953

13 Claims. (Cl. 104—162)

This invention relates to an improved car shifting apparatus and more particularly to an apparatus of this type having the dual capability of exerting a car-advancing and a car-retarding action. The invention is directed generally to an arrangement wherein a series of cars movable along rails may be shifted under control by an operator and wherein the rails on which the cars move may be horizontal or on an upward or downward grade. The invention is especially useful under conditions in which space limitations is a factor, as in underground coal mines, although it may be employed equally well under conditions having no space limitations, as in open quarries or other industrial installations.

An object of our invention is to provide an improved car shifting apparatus which is self-contained and which may be moved as a unit from one site of use to another site of use.

Another object is to provide an improved car shifting apparatus which employs simultaneously acting car-retarding and car-advancing members.

Another object is to provide an improved car shifting apparatus having a pressure fluid system arranged for readily accomplishing a transfer of car-retarding action from one car-retarding member to another car-retarding member.

Another object is to provide an improved mechanical means for disengaging a car-retarding member from contact with a car.

Other objects and advantages will become apparent as the description proceeds and when considered in conjunction with the accompanying drawings in which:

Fig. 1 is a schematic side elevation view of a trip of cars under control of the car shifting apparatus at the instant of transfer of the car-retarding action from one barney to the other barney.

Fig. 2 is a plan view of one portion of the car shifting apparatus.

Fig. 2A is a plan view of the complementary portion of the apparatus shown in Fig. 2.

Fig. 3 is a side elevation view of one of the cylinder and barney assemblies with parts shown fragmentarily and in section.

Fig. 4 is a diagrammatic view of a shifter rod arrangement.

Fig. 5 is a sectional view along line 5—5 of Fig. 2 and extended to include the rails for the cars.

Fig. 6 is a diagrammatic view of a portion of the pressure fluid system.

Fig. 6A is a diagrammatic view of the complementary portion of the system shown in Fig. 6.

Fig. 7 is a side elevation view of a cam for lowering the car-retarding dog, and Fig. 8 is an end elevation view of the cam of Fig. 7.

In accordance with our invention, a pair of power cylinders in a fluid power circuit are arranged parallel to and preferably, but not necessarily, in longitudinally offset relation to, each other and are mounted upon a frame-work disposed between the rails on which the cars move. These cylinders drive barneys each of which mounts a car-advancing dog and a car-retarding dog. The barneys are interconnected so that as one advances it serves to retract the other, but the speed of barney movement is made dependent upon the displacement of the spent power fluid ahead of the retracting barney. This displacement in turn is controlled by valve means maintaining a predetermined back pressure in the exhaust line from the power cylinders. A compensating fluid circuit receives fluid from the exhaust line and contains a cylinder having therein a piston slidable in the direction of car travel in opposition to the fluid pressure in the compensating cylinder, this piston being connected to the barney interconnecting means. As this piston periodically moves in the direction of car travel, the car-retarding dog on the barney whose cylinder is currently receiving pressure fluid, is moved into car disengaging position, thus transferring the retarding action to the other barney. After such transfer takes place, the piston then moves to its original position under the influence of the fluid in the compensating circuit.

As shown in Fig. 1, a trip of connected cars, here shown as three at 10, 11 and 12, although any suitable number in excess of one may be employed, is adapted to move along rails 13 and 14. These cars, when used for loading within a mine, for example, may be moved under a loading apparatus generally indicated at 15. Each car is provided with a suitable means, commonly called a "car-haul," projecting downwardly and adapted to be engaged by pivoted members, commonly called "barney-dogs," which members in turn are carried by massive reciprocable structures commonly called "barneys." As used herein, the term "barney" is not limited to a single such structure, but may include a connected group of structures carrying dogs and with all such structures movable along the same guides. The dogs of the forwardmost travelling barney comprises a retarding dog 16 and an advancing dog 17 while the rearwardmost travelling barney includes a retarding dog 18 and an advancing dog 19. These respective dogs are adapted to engage with the car hauls 20 and 21 on the cars 11 and 12, for example.

Referring now to Figs. 2 and 2A, we provide a pair of elongated cylinders 22 and 23 which may be in overlapping substantially parallel relation and mounted in a framework adapted to be installed between the rails on which the cars move. Piston rods 24 and 25 connected to pistons 26 and 27 within the respective cylinders and having an articulated connection at their outer ends to barneys 28 and 29, may be employed, and in general are constructed in the manner best shown in Stamler U.S. Patent 2,606,504. At this time it may be noted that these are single acting cylinders having a single conduit 30 and 31, respectively, attached thereto, at their rear ends and through which pressure fluid must pass during either forward or rearward motion of the pistons and the barneys attached thereto. For the purpose of insuring related movements of the barneys, a suitable barney-interconnecting means capable of withstanding heavy forces, such as a heavy flexible wire rope 32, is attached at a pin 33 to the barney 28 and at a pin 34 to the barney 29, being trained around a sheave 35 in a slidable carriage 36. This carriage likewise is mounted upon the framework now to be described.

As seen in Fig. 5, the framework may conveniently comprise a first channel-shaped side beam 40, a second channel-shaped side beam 41 and an intermediate beam 42 of suitable shape, all joined into a unitary assembly by transverse brace plates 43, 44 and 45 (Figs. 2 and 2A). As indicated in the aforementioned Stamler patent, these beams serve as barney guides, have a low overall height which serves to nest the assembly well below the cars travelling overhead, and provide an integral rugged compact framework which may be dragged from place to place in a trackage system as by means of a locomotive. When positioned at a point of use, the framework moreover may be disposed centrally of the car tracks by suitable separate lateral spacers 46, one being shown in Fig. 5, and which are not secured to the beams, but which lie between the car tracks and pass beneath the beam feet. Such spacers are supported at each end by extension plates 47 and 48 borne on the car track flanges and with locating blocks 49 and 50 fixed to the upper surfaces of the spacer and in contact with the edges of the outermost beams 41 and 40. Moreover, conventional track anchor means, not shown, may be attached to one or both ends of the framework and secured to the rails or the ties, or both, for the purpose of holding the above-described framework against forward or rearward shifting during use.

As seen in Fig. 3, each barney is provided on each side with two or more shoes 51 and 52 of channel-like form and pivotally mounted to ride along corresponding guides 53, 54, 55 and 56 which are rigidly fixed to the confronting surfaces of the above-described beam members. Each barney also carries at least one retractable pawl or dog for car-advancing purposes and which is biased upwardly as indicated in Fig. 3 by a suitable spring 57. Upward movement of this dog is limited by a leg 58 attached to the dog structure and adapted to abut against a stop 59 formed in the body of the barney. As the barney moves in its car-advancing direction, the spring thus holds the dog upwardly to engage with the car-haul, but as the barney moves in the opposite direction and the dog is struck by another car-haul, that dog is free to move downwardly and to pass under the car-haul.

As a significant feature of the invention, each barney also is equipped with one or more car-retarding dogs which are pivotally mounted on an axis transversely of the barney body and include a cam follower arm 60, as seen in Fig. 3. Mounted within the barney body along an axis parallel to the piston rod and cylinder for the barney, is a rotatable cam 61 which has an aperture therethrough. This cam at all times is in contact with the cam follower 60. The car-retarding dog moreover is biased to upward position by a suitable spring 62 and carries a leg member 63 adapted to abut against a stop 64 formed in the body of the barney. It will be understood that the invention may be employed with a plurality of car-advancing and car-retarding dogs on each barney and may also be employed with arrangements wherein a car-advancing dog engages with the car-haul on one car while a complementing car-retarding dog on the same barney is engaging with the car-haul on a succeeding car in the trip.

Each barney has an aperture extending completely therethrough for receiving a non-circular shaft, the aperture 65 and shaft 66 for barney 29 being seen in Fig. 5 and the shafts 66 and 67 being shown in Figs. 2 and 2A. The cam actuating shafts 66 and 67 pass through the cams for lowering the car-retarding dogs and are sufficiently long to remain in engagement with such cams regardless of the position occupied by the barneys during their reciprocation.

At their extreme forward ends, the cam actuating shafts 66 and 67 are attached to the rotors of conventional reciprocating rotary power motors 68 and 69, respectively. These motors may be of the oscillating vane type actuated by a pressure fluid which is supplied thereto by a pair of suitable pilot valves 70 and 71 controlling the direction of motor rotation and with these valves being incorporated into the pressure fluid system later to be described. These motors are mounted within the framework of the car shifting apparatus at fixed locations. At the side of these motors opposite the shafts 66 and 67, additional shafts are attached to the rotors of the motors, one such shaft carrying thereon a cam 72 and the ohter such shaft carrying a cam 73, the purposes of which will later become apparent. We prefer to arrange these cams 72 and 73 so that their camming action becomes effective after the camming action of the respective shafts 66 and 67 has already taken place, the purpose of which will later be seen.

Referring now to Fig. 4, a barney actuated shifter rod is shown diagrammatically. It will be understood that one such rod is provided for each of the barneys and that the construction of both rods is substantially identical. As shown, the barney 28 is adapted to strike a lug 80 on an elonagted shifter rod 81 when the barney approaches its rearmost point of travel and to strike a similar lug 82 on that rod when it approaches its forwardmost point of travel. The shifter rod may conveniently be mounted for shiftable movement in brackets, not shown, attached to the inner face of the barney guide beam 40 and after being engaged by the barney, will be displaced a predetermined distance in the direction in which that barney is travelling. Thus, the distance between lugs 80 and 82 is such that the lugs are engaged alternately by the barney as it approaches the extreme points in its path of travel. Furthermore, when the shifter rod is moved by the barney to the limit of rod movement in one direction, it remains in that shifted position until the barney again strikes a lug on the rod while moving in the opposite direction. At one end, the shifter rod 81 is provided with a cam extension 83, the companion shifter rod for barney 29 being provided with a similar cam extension 84, shown diagrammatically in Fig. 6.

Considering now Fig. 2, the fluid pressure pilot valve 71, later to be described and controlling flow of pressure fluid to and from the motor 69, as well as the direction of rotation of that motor, is mounted in the beam 40 and has a cam follower projecting through that beam for engagement by the cam 83 on the shifter rod 81 as actuated by the barney 28. Likewise, the similar fluid pressure pilot valve 70 controlling flow of pressure fluid to and from motor 68, as well as the direction of rotation of that motor, is mounted in the beam 41 and has a follower projecting through that beam for engagement with the cam 84 on the shifter rod as actuated by the barney 29. With further reference to the cams carried by the barneys for lowering the car-retarding dogs, one of these cams is best shown in Figs. 7 and 8, it being understood that the other cam is of a similar construction. For example, the cam 61 has extending therethrough a non-circular aperture 90 providing a close fit with the non-circular shafts attached to the rotary motors and along which the barneys reciprocate. The cam on the face confronting the cam-followers of the retarding dog has a curved surface 91 intermediate a flat surface 92 and a flat surface 93. These flat surfaces provide dwell positions corresponding to those times when the rotor of the fluid motor is held fully displaced at its extremes of rotation. On its opposite side, the cam is provided with a cylindrical extension 94 adapted to fit in a suitable bushing within the barney and to be held against axial shifting by a suitable snap ring fitting into the groove 95 of that extension. When, for example, the cam is rotated so that the cam follower of the retarding dog is resting on cam flat 93, the dog is being held in depressed condition. Likewise, when the cam follower rests on cam flat 92, the spring of the retarding dog is fully extended and that dog is then being held in its car-engaging or first position.

With the foregoing mechanical structure in mind, reference now is made to Figs. 6 and 6A showing a pressure fluid system suitable for operating the improved car shifting apparatus and particularly for accomplishing the heretofore normally difficult transfer of car-retarding action from the car-retarding dog on one barney to the car-retarding dog on the other barney.

A suitable tank 100 at atmospheric pressure contains a volume of oil or other subtantially incompressible fluid. A drive motor 101 which may be controlled in any suitable manner for stopping and starting the movement of the car-shifting apparatus, is adapted to drive a first pump 102 serving what may conveniently be termed a pilot fluid circuit. The same motor may also drive a second and larger pump 103 serving what may conveniently be called a working fluid circuit. Each of these pumps draws fluid from the tank 100 through strainers as shown and from a common manifold 104.

Assuming that the dogs 16 and 17 of the right hand barney 28 are now engaged with the car-haul of a particular car and that the piston 26 of cylinder 22 is now at the beginning of a stroke, the following operation will ensue. Pump 102 supplies fluid at, for example, a pressure of about 400 p.s.i. into conduit 105. Through a first branch conduit 106 this fluid passes to valve 107 controlled by the cam 73 of the rotary fluid motor 69. This valve preferably is a Vickers type C-572E wherein the valve spool is depressed while the cam 73 is in contact therewith. At the time when cam 73 is in contact with this valve, the rotor portion of motor 69 and the setting of cam shaft 67 is such that the retarding dog on barney 28 is up and in engagement with the car-haul. Pilot fluid then flows through valve 107 into conduit 108 and against the piston at one end of the working circuit shift valve 109, conveniently called the main valve. The main valve 109 preferably is a Vickers type C-1420 four-way valve having pilot pistons at each end to effect shifting of the valve. In the position as seen in Fig. 6, the main valve 109 is directing working fluid into the end 30 of cylinder 22 through conduit 110 and is bleeding fluid from the end 31 of cylinder 23 through conduit 111 and into the exhaust or throttled conduit 112, later to be described. Also, the pilot pressure on the other pilot piston of the valve 109 is now vented to tank through conduit 113. It is significant to note that at all times a predetermined back pressure is maintained in exhaust conduit 112 and that the barneys can move only as fast as the exhausting fluid is moved through that exhaust conduit.

Fluid from pump 102 also is now passing through a second branch conduit 114 to valve 115 controlled by cam 72 of the rotary fluid motor 68. This valve also is a Vickers type C-572E and since the cam 72 of motor 68 is now out of contact with the valve 115, the valve spool is extended and the fluid from conduit 114 is blocked. In this position, the valve provides a drain passage between conduit 113 and drain manifold 116 leading back to tank 100. At this time the position of the rotor in rotary motor 68 is such that the setting of the cam shaft 66 is causing the cam within barney 29 to hold the retarding dog of that barney down. Thus, as the barney 29 moves on its rearward stroke (fluid now throttling out of its cylinder 23), the depressed retarding dog will pass under the car-haul of the on-coming car.

Referring further to Fig. 6, fluid from pump 102 also passes through a third branch conduit 117 into valve 71 associated with the shift rod which is actuated by barney 28. This valve preferably is a Vickers type C-476-EA four-way roller operated valve with a spring biased spool therein. Thus, when the cam at the end of the shifter rod presses against the valve roller, the valve adopts one setting and when that cam is pulled away from contact with the valve roller, the valve adopts its other setting. As seen in Fig. 6, valve 71 is in extended position since the barney 28 had previously moved the cam 83 on the shift rod to the rear. In the position thus shown, fluid passes from branch conduit 117 through valve 71 into conduit 118 and into rotary motor 69. At this time, the fluid entering that motor holds the rotor thereof in one extreme position wherein the shaft of the rotor is causing the cam 73 to depress valve 107 and the cam shaft 67 to withdraw the cam in the barney 28 from camming contact with the car-retarding dog of that barney. The opposite side of the rotor within that motor meanwhile is connected to drain through conduit 119, valve 71, conduit 120 and drain manifold 116.

At this time, fluid from pump 102 also is passing through a fourth branch conduit 121 into valve 70 associated with the shift rod which is actuated by barney 29. This valve is a Vickers type C-476-EA, as described above. It however, is in depressed position due to the cam 84 on the shift rod actuated by barney 29, since on its previous forward movement that barney had moved the cam into contact with the valve roller and had left it there as the cylinder 23 starts to vent. In this condition, pilot pressure fluid at about 400 p.s.i. is directed to rotary motor 68 through conduit 122 and holds the rotor of that motor at one extreme position of movement. The rotor accordingly has turned cam shaft 66 so as to exert torque on the cam within barney 29 and at the same time has moved cam 72 from contact with valve 115. Since the cam in barney 29 is now acting on the cam follower and will continue to do so until flow to motor 68 is reversed, the car-retarding dog of barney 29 will remain depressed during the entire rearward movement of the barney 29. This, of course, is possible in view of the length of the shaft 66 and its sliding engagement through the apertures in the barney and the cam carried by the barney. Also at this time, the opposite side of the rotor in motor 68 is connected to drain through conduit 123, valve 70 and drain manifold 116. As will be noted, the foregoing pressure fluid circuit contains only that fluid circulated by pump 102 and thus is termed the pilot fluid circuit.

Considering now the working fluid circuits of the system, pump 103, which preferably is larger than pump 102, delivers fluid under pressure into conduit 130. For the purpose of exerting an additional control on the movement of the barneys, we provide an optional, manually controlled by-pass 131 having a conventional valve 132 therein and which permits a venting of conduit 130 into tank 100 as desired. However, with the apparatus in operation, as above described, working fluid which, under certain operating conditions, may reach a pressure of about 1000 p.s.i., passes from conduit 130 past a simple check valve 133 into conduit 134. This check valve serves to prevent return flow of fluid from cylinders 22 and 23 at such times as pump pressure is less than system pressure, as, for example, when the load and the fluid pressure of those cylinders are in equilibrium for an extended period of time. Upon passing check valve 133, the working fluid passes through conduit 134, main valve 109, and conduit 110 into cylinder 22, in the arrangement of Figs. 6 and 6A, and the barney for cylinder 22 starts to move. As it so moves, its car-advancing dog pushes the trip of cars and its car-retarding dog holds against the trip of cars and the actual movement of the trip conforms to the movement of that barney. Thus, whether the trip of cars is on a horizontal track or on an inclined track, its movement is commensurate with the barney movement. Due, however, to the interconnection between the respective barneys afforded by the rope 32, forward movement of barney 28 can occur only if barney 29 can simultaneously move to the rear under the described conditions. Movement of barney 29 to the rear can occur only if the fluid then in cylinder 23 can be vented. As an essential feature of our invention, we employ a control, later to be described, upon the venting of the respective cylinders and utilize this control during the transfer of the car-retarding action from one barney to the other barney.

As barney 28 then moves forward, barney 29 is retracted and fluid is vented from cylinder 23 through conduit 111, valve 109 and conduit 112 and into a conduit 135 intermediate the valves 136 and 137. Valve 137 preferably is a Vickers RT Series sequence control valve. This valve is preferably set to vent into conduit 138 at a pressure of about at least 250 p.s.i., thus effecting a throttling of the fluid coming from conduit 112 and maintaining a back pressure of at least 250 p.s.i. upon the piston for the retracting barney, as well as in conduit 135. By means of a pilot circuit through conduit 139 attached to conduit 130 upstream of check valve 133 and connected to each of valves 136 and 137, a regulating pressure of at least 125 p.s.i. is constantly applied to serve as the remote control upon these respective valves. Under normal conditions, valve 137 is set so as to pass fluid venting from cylinder 23 into conduit 138 at an average minimum pressure of about 250 p.s.i. Attached to conduit 138 is a valve 140 which may comprise a Vickers CT Series relief valve. This valve discharges into conduit 141, connected to drain manifold 116 leading to tank 100. The function of this valve essentially is to maintain the back pressure upon valve 137 which in turn controls the exhausting pressures in conduits 112 and 135. As above described, the working fluid circuit from pump 103 through the system and back to tank 100 thus is separate from the previously described pilot fluid circuit.

As an essential feature of the invention, we further provide a third circuit which may conveniently be called a compensating circuit and before describing the same, reference again is made to Fig. 2A. Within the framework, the carriage 36 carrying sheave 35 therewith is slidably mounted. Attached to the carriage is a plurality of piston rods 150, 151, and 152 connected to pistons which are movable within cylinders 153, 154 and 155. These cylinders are rigidly attached to the framework and at their rearward ends are provided with drain passages leading into a drain conduit 156 (Fig. 6A) which terminates above the level of fluid in tank 100. The number and size of the pistons contained in this structure may be varied provided that at all times the effective total area of piston surface in this structure, herein called enlarged piston means, is greater than the effective total area of piston surface in the working cylinders 22 and 23.

During the supply of working fluid to cylinder 22 as above described, the fluid being vented from cylinder 23 maintains a pressure of about 250 p.s.i. in conduit 135 and enters valve 136 at this pressure. Valve 136 preferably is a Vickers RT Series sequence control valve of the hydro-cushion construction remotely controlled and with a suitable drain connection, and is set to open at a pressure of about 125 p.s.i. minimum and to equalize pressures in conduits 135 and 157 upon its opening. Leading from the valve is a conduit 157 connecting to one end of each of cylinders 153, 154 and 155 and adapted to remain filled with fluid at all times. When valve 136 is open, the pressure of fluid from conduit 112 is applied to the pistons in the cylinders 153, 154 and 155 and is sufficient to hold those pistons fully retracted in those cylinders during the operation of the machine, except when the retarding-dog transfer of load is to occur.

Having the foregoing description in mind, the following operation of the apparatus occurs as the trip of cars is moved forward by barney 28. As that barney approaches its forwardmost point of travel with its retarding dog in engagement with a car haul on one car, the barney 29 approaches its rearmost point of travel. At this time barney 28 abuts against lug 82 on its shift rod and moves it forward thus causing cam 83 to depress the plunger of valve 71. As this occurs, pilot pressure from conduit 117 is directed to motor 69 through conduit 119, the fluid in that motor then venting through conduit 118, valve 71 and conduit 120. This motor is now ready to turn as soon as a sufficiently loose contact between the retarding dog of the barney 28 and the car-haul will permit.

When this loose contact then occurs, the rotor of motor 69 turns, the cam shaft 67 turns the cam in the barney and causes that retarding dog to depress thus leaving the retarding dog on barney 29 in control of the trip of cars. Also, as the rotor of motor 69 turns, its cam 73 breaks contact with valve 107 and this valve shifts, causing pilot fluid from conduit 106 to be blocked and connecting conduit 108 to conduit 160 leading to drain manifold 116.

Simultaneously with the described action of barney 28, the companion barney 29 in its rearward movement has abutted against a lug on its shift rod and has moved cam 84 out of contact with valve 70 so that pilot pressure is now being supplied to motor 68 through conduit 123 and fluid in that motor is being vented through conduit 122, valve 70, and into drain manifold 116. The completion of the actions attendant upon movement of barney 29 occurs during a short, but significant interval of time after barney 28 had caused the movement of valve 71, which interval may conveniently be termed a transfer interval. Since there is nothing to cause hesitation of the rotor of motor 68 at this time, it promptly turns to its new position and rotates cam shaft 66, thus removing the cam in barney 29 from camming contact with that retarder dog and permitting that dog to rise into engagement with the on-coming car. At this instant, the retarding dogs on both barneys are in engagement with the trip of cars as are preferably, the car-advancing dogs on both barneys.

As motor 68 thus turns, its cam 72 now shifts the plunger of valve 115 whereupon pilot pressure is supplied to main valve 109 through conduit 113, it being noted that this valve is still resting in the position which it formerly occupied. When this occurs, the fluid in conduit 113 then moves the main valve 109 whereupon working fluid from conduit 134 then passes through valve 109 into conduit 111 leading to cylinder 23 and cylinder 22 is vented through conduit 110, valve 109 and into the throttling conduit 112. It will be understood that at this time due to the rope connection between the barneys and the arrangement of the cylinders, barney 29 with its retarding and advancing dogs now moves forward carrying the trip of cars with it. When it in turn approaches its forwardmost position it strikes a lug on its shift rod, moves cam 84 into contact with valve 70 and initiates the above described movements of the several cams, rotary motors, and valve shifts to again bring the parts into the relation seen in Figs. 6 and 6A. However, when barney 29 so shifts its cam 84 to initiate this condition, another short but signifiicant transfer interval ensues before the main valve 109 again shifts its position.

Recapitulating now the functioning of the apparatus and fluid perssure system during these significant transfer intervals of time, it will be noted that, until main valve 109 shifts, fluid still is supplied to the cylinder which it had previously been entering. Assuming the system to be operating, as seen in Figs. 6 and 6A and with barney 29 approaching its rearmost position and having moved cam 84 of its shift rod from contact with valve 70, the retarding dogs of both barneys are now in engagement with the trip of cars. The pushing action of the car-advancing dog of barney 28 acting through the rope 32 exerts a force upon barney 29 and its retarding dog tending to complete its final phase of movement toward the rear. At the same time, the momentum of the trip of cars which is engaged with the retarding dog on barney 29 acts to oppose that dog and barney in their final phase of movement to the rear. So long as no cavitation in the outlet 31 from cylinder 23 takes place, the final rearward movement of barney 29 can occur only by venting the remainder of the fluid in that cylinder. Valves 136 and 137 serve to prevent any such cavitation. Accordingly, as the force of momentum of the trip of cars continues to be applied, the entire rope 32 remains under tension. Thus, the pistons in cylinders 153, 154 and 155 are pulled in an outward direction against the force of the compensating fluid in conduit 157, the displaced fluid then simultaneously spilling through valve 136 into the conduit 135 and with a portion also passing into conduit 112 for preventing cavitation in cylinder 23. As the compensating pistons so move in the direction of travel of the cars, the carriage 36 moves with the cars. Since working fluid is still passing into cylinder 22, the barney 28 keeps abreast of the car movement and its car-retarding dog is then in loose contact with the car-haul, which makes possible the above-described movement of the rotor in motor 69. Barney 29 at this time, however, is still trying to move rearwardly and its car-retarding lug is in tight contact with the car-haul on the succeeding car. During this transfer interval, barney 28 shifts the cam 83 of its shift rod, as above described, rotary motor 69 turns, and the retarding dog of barney 28 in loose contact with the car is depressed, leaving the retarding dog on barney 29 in control of the trip of cars. Immediately upon the depressing of the car-retarding dog of barney 28, main valve 109 shifts and working fluid begins to exhaust from cylinder 22 and also to enter cylinder 23. As fluid begins to leave cylinder 22 through valve 109 and exhaust conduit 112, it first flows through valve 136 into the compensating circuit of conduit 157. As this circuit refills, the pistons in cylinders 153, 154 and 155 move slowly to the right as shown pulling the carriage 36 against the travel of the trip of cars and effecting a snubbing action on the continued movement of cars until the compensating circuit is replenished. It will be understood that during this snubbing action the trip of cars is not moved rearwardly, but rather is either held stationary or else permitted to advance more slowly than normal. After the replenishment of the compensating circuit, the barneys then advance the trip at the normal rate. During this replenishment no cavitation in front of the piston 26 of cylinder 22 can occur, due to the action of valves 136 and 137. This refilling action of the compensating circuit is made possible by the relatively large piston areas working in the several compensating cylinders as compared to the smaller piston areas found in the working cylinders.

In similar fashion, when barney 29 approaches the end of its forward stroke the thus described transfer interval of time before main valve 109 again shifts, permits the retarding dog on barney 28 to again take over the load from the cars before the retarding dog on barney 29 is again depressed.

When it is desired to stop operation of the apparatus temporarily, the manual valve 132 in the working fluid circuit may be moved to venting position and the apparatus brought to rest with valves, cams, and motors in readiness for resumption of operation upon resupply of working fluid into conduit 130. When it is desired to terminate operation of the apparatus for an extended period of time, drive motor 101 is brought to rest.

Many advantages of the invention will be apparent to those skilled in the art. For example, the power unit comprising the drive motor and pumps and fluid reservoir may be compactly mounted and have no difficult space requirements; fluid components are included in the apparatus as a whole and any accident to the conduits will lock the barneys automatically without requiring action of an operator; and the operation of the drive motor may be controlled from a remote point.

It will be appreciated that while one form of our invention has been described in detail, the invention is not limited solely to the apparatus as shown. On the contrary, it is intended that the invention is to be limited only as described in the appended claims.

What is claimed is:

1. A car shifting apparatus comprising a pair of fluid power cylinders arranged in substantially parallel relation to each other, barneys connected to pistons in said power cylinders respectively to be actuated thereby, at least one car-advancing dog and one car-retarding dog being pivotally mounted on each barney and movable between a first car-engaging position and a second car-disengaging position, means interconnecting said barneys for causing the advancing barney to retract the other barney, a fluid power source, valve means for directing power fluid from said source alternately into each of said power cylinders and exhausting fluid from the other power cylinder into an exhaust conduit maintained under a predetermined back pressure, valve means for maintaining said back pressure, a compensating fluid circuit receiving fluid from said exhaust conduit, a compensating cylinder assembly in said compensating circuit having enlarged piston means connected to said barney interconnecting means, said enlarged piston means being constructed to slide a limited distance in the direction of car travel and in opposition to the fluid pressure in said compensating cylinder assembly, means for returning excess fluid from said exhaust conduit and from said compensating circuit to said power source, and means for moving to its second position the car-retarding dog of the barney whose cylinder is receiving power fluid during the movement of said enlarged piston means in the direction of car travel.

2. Apparatus as defined in claim 1 wherein said means for moving said car-retarding dogs is actuated in dependence upon the movement of both of said barneys.

3. Apparatus as defined in claim 1 wherein said means for moving said car retarding dogs to their second position is actuated during the interval of time at which said enlarged piston means is sliding in the direction of car travel.

4. Apparatus as described in claim 1 wherein the effective working area of said enlarged piston means is greater than the effective combined working areas of said pistons in said power cylinders.

5. A car shifting apparatus comprising a pair of fluid power cylinders arranged in substantially parallel relation to each other, barneys connected to pistons in said power cylinders respectively to be actuated thereby, at least one car-advancing dog and one car-retarding dog being pivotally mounted on each barney and movable between a first car-engaging position and a second car-disengaging position, means interconnecting said barneys for causing the advancing barney to retract the other barney, a fluid power source, main valve means for directing power fluid from said source alternately into each of said power cylinders and exhausting fluid from the other power cylinder into an exhaust conduit maintained under a predetermined back pressure, means actuated by movement of said barneys for shifting said main valve means following the movement to its second position of the car-retarding dog on the barney whose cylinder is receiving power fluid, valve means for maintaining said back pressure, a compensating fluid circuit receiving fluid from said exhaust conduit, a compensating cylinder assembly in said compensating circuit having enlarged piston means connected to said barney-interconnecting means, said enlarged piston means being constructed to slide a limited distance in the direction of car travel and in opposition to the fluid pressure in said compensating cylinder assembly, means for returning excess fluid from said exhaust conduit and from said compensating circuit to said power source, and means for moving to its second position the car-retarding dog of the barney whose power cylinder is receiving power fluid during the movement of said enlarged piston in the direction of the car travel.

6. A car shifting apparatus comprising a pair of fluid power cylinders arranged in substantially parallel relation to each other, barneys connected to pistons in said power cylinders respectively to be actuated thereby, at least one car-advancing dog and one car-retarding dog being pivotally mounted on each barney and movable between a first car-engaging position and a second car-disengaging position, means interconnecting said barneys for causing the advancing barney to retract the other barney, a fluid power source containing a working power fluid circuit and a pilot fluid circuit, main valve means in said working circuit for directing power fluid alternately into each of said power cylinders and exhausting fluid from the other power cylinder into an exhaust conduit maintained under a predetermined back pressure, a pair of rotary motors associated respectively with each power cylinder and receiving fluid from said pilot circuit, a pair of first pilot valves actuated respectively by each of said motors for controlling the flow of fluid in said pilot circuit to and from said main valve, a pair of second pilot valves actuated respectively by said barneys for controlling the flow of fluid in said pilot circuit to said rotary motors, valve means for maintaining said back pressure, a compensating fluid circuit receiving fluid from said exhaust conduit, a compensating cylinder assembly in said compensating circuit having enlarged piston means connected to said barney interconnecting means, said enlarged piston means being constructed to slide a limited distance in the direction of car travel and in opposition to the fluid pressure in said compensating cylinder assembly, means for returning excess fluid from said exhaust conduit and said compensating circuit to said power source and means operable by said motors for moving to its second position the car-retarding dog of the barney whose power cylinder is receiving power fluid during the movement of said enlarged piston means in the direction of car travel.

7. Apparatus as defined in claim 6 wherein said rotary motors are constructed to move said car-retarding dogs to said second positions prior to moving said first pilot valves.

8. Apparatus as defined in claim 6 wherein said main valve supplies working fluid to a single end of said power cylinders.

9. Apparatus as defined in claim 6 wherein said second pilot valves are actuated by shift rods mounted in the path of movement of said barneys.

10. Apparatus as defined in claim 6 wherein said rotary motors are attached to elongated rods engageable with cam means carried by said barneys for moving the respective retarding dogs to said second position.

11. Apparatus as defined in claim 10 wherein said rods are non-circular in cross section.

12. In a car shifting apparatus, a reciprocable barney having a car-retarding dog pivotally mounted thereon and a spring for normally biasing said dog into position for engaging the car while disposed above said barney, a cam follower rigidly secured to said dog, a cam mounted within said barney for engagement with said cam follower, elongated rotatable means extending through said cam and said barney and along which said cam and barney may reciprocate, and a rotary motor for moving said elongated means and said cam between a second position in which said cam follower is moved by said cam to pivot said dog downwardly out of engagement with said car and a first position in which said cam follower is moved out of camming engagement with said cam to permit said spring to move said dog upwardly for engagement with said car.

13. In a car shifting apparatus, a reciprocable barney having shoes engageable with guides mounted upon a stationary framework, a shift rod mounted upon said framework and engageable by said barney as it approaches the ends of its path of movement, a pressure fluid source, means attached to said barney and receiving fluid from said source for moving said barney, and valve means for directing fluid to said barney moving means from said source, said valve means being actuated in dependence upon the position of said shift rod thereby to change the direction of movement of said barney as said shift rod is moved.

References Cited in the file of this patent
UNITED STATES PATENTS

| | | |
|---|---|---|
| 1,743,782 | Kershaw | Jan. 14, 1930 |
| 2,421,690 | Ensor et al. | June 3, 1947 |
| 2,606,504 | Stamler | Aug. 12, 1952 |
| 2,847,945 | Merritt | Aug. 19, 1958 |